United States Patent [19]

Griffin

[11] Patent Number: 5,111,895

[45] Date of Patent: * May 12, 1992

[54] CUTTING ELEMENTS FOR ROTARY DRILL BITS

[76] Inventor: Nigel D. Griffin, 15 Paynes Meadow, Whitminster, Gloucestershire, England

[*] Notice: The portion of the term of this patent subsequent to Aug. 14, 2007 has been disclaimed.

[21] Appl. No.: 510,160

[22] Filed: Apr. 16, 1990

Related U.S. Application Data

[63] Continuation-in-part of Ser. No. 321,772, Mar. 10, 1989, Pat. No. 4,947,945, and a continuation-in-part of Ser. No. 479,958, Feb. 14, 1990, abandoned.

[30] Foreign Application Priority Data

| Mar. 11, 1988 | [GB] | United Kingdom | 8805789 |
| Feb. 14, 1989 | [GB] | United Kingdom | 8903246 |
| Nov. 10, 1989 | [GB] | United Kingdom | 8925409 |

[51] Int. Cl.⁵ .................... E21B 10/46; E21B 10/52
[52] U.S. Cl. .................... 175/425; 175/374; 175/426; 51/309; 76/DIG. 11; 76/108.2; 76/108.4
[58] Field of Search .......... 175/329, 379, 409, 410; 51/293, 307, 309, DIG. 26; 76/101 E, 108 A, DIG. 11, DIG. 12; 428/697, 698, 932

[56] References Cited

U.S. PATENT DOCUMENTS

| 3,982,911 | 9/1976 | Lee | 51/307 |
| 4,128,136 | 12/1978 | Generoux | 175/410 |
| 4,311,490 | 1/1982 | Bovenkerk et al. | 51/293 |
| 4,319,707 | 3/1982 | Knemeyer | 228/46 |
| 4,359,335 | 11/1982 | Garner | 175/379 |
| 4,604,106 | 8/1986 | Hall et al. | 175/410 |
| 4,626,281 | 12/1986 | Sheinberg | 175/238 |
| 4,686,080 | 8/1987 | Hara et al. | 51/309 |
| 4,694,918 | 9/1987 | Hall | 175/410 |
| 4,722,405 | 2/1988 | Langford, Jr. | 175/410 |
| 4,787,464 | 11/1988 | Ojanen | 175/410 |
| 4,824,442 | 4/1989 | Cerceau | 51/309 |
| 4,875,907 | 10/1989 | Phaal et al. | 51/309 |

FOREIGN PATENT DOCUMENTS

| 2151283A | 7/1985 | United Kingdom . |
| 2152104A | 7/1985 | United Kingdom . |
| 2216577A | 10/1989 | United Kingdom . |

*Primary Examiner*—William P. Neuder
*Attorney, Agent, or Firm*—Browning, Bushman, Anderson & Brookhart

[57] ABSTRACT

A cutting element for a rotary drill bit comprises a thin superhard table of polycrystalline diamond material, defining a front cutting face, bonded to a less hard substrate. The substrate is formed from a material containing at least a proportion of tungsten metal. The substrate may be formed of a metal matrix composite comprising tungsten metal particles in a metal binder phase comprising material selected from: Cu, Co, Ni+Cu, Ni+Fe, Ni+Fe+Mo, Co+Ni. The substrate may also include tungsten carbide in which case the tungsten metal may be replaced by another softer refractory material.

15 Claims, 3 Drawing Sheets

CUTTING ELEMENTS FOR ROTARY DRILL BITS

CROSS-REFERENCE TO RELATED APPLICATIONS

This is a continuation-in-part of my U.S. application Ser. No. 321,772, filed Mar. 10, 1989, now U.S. Pat. No. 4,947,945 and a continuation-in-part of my U.S. application Ser. No. 07/479,958, filed Feb. 14, 1990, now abandoned.

BACKGROUND OF THE INVENTION

The invention relates to rotary drill bits for use in drilling or coring holes in subsurface formations and, in particular, to cutter assemblies and cutting elements for use on such bits, and methods of manufacturing such cutting elements Rotary drill bits of the kind to which the invention relates comprise a bit body having a shank, for connection to a drill string, and a passage for supplying drilling fluid to the face of the bit. The bit body carries a plurality of so called "preform" cutting elements at the surface. Each cutting element comprises a thin facing table of superhard material, which defines the front cutting face of the element, bonded to a less hard substrate.

Normally the superhard table is formed of polycrystalline diamond material and the substrate is formed of cemented tungsten carbide. The preform cutting elements are usually mounted on the bit body by each being bonded to a carrier which may be in the form of a stud of cemented tungsten carbide which is received and located in a socket in the bit body. The cutting elements may be bonded to their respective carriers by brazing, for example using the process known as "LS bonding".

Tungsten carbide has certain characteristics which render it particularly suitable for use in the substrate and carrier of such a cutter assembly. Thus, it exhibits high rigidity, high resistance to the erosion to which such cutter assemblies are subject in use, and hot strength. Also, the coefficient of expansion of tungsten carbide is sufficiently close to the coefficient of expansion of polycrystalline diamond to reduce the residual stresses which can occur when the two materials are bonded together. However, some of the other characteristics of cemented tungsten carbide have certain disadvantages. For example, cemented tungsten carbide has low toughness (i.e. it is comparatively brittle) and this can lead to failure of such cutter assemblies in use, as a result of impact forces on the assembly.

Also, when a preformed cutting element of the kind referred to is mounted on a drill bit, it is mounted with its front face facing in the direction of movement, its rear face trailing behind and part of the peripheral surface of the cutting element, between the front and rear surfaces, rubbing on the formation being drilled. As drilling proceeds this intermediate surface wears down to form a wear-flat. After prolonged use, this flat may extend on to the carrier.

Due to its two-layer construction, the cutting element is self-sharpening since the part of the less hard substrate which rubs on the formation wears away more quickly than the part of the diamond table rubbing on the formation. Since the rearward substrate wears away more quickly, it does not bear on the formation being cut to the same extent or with the same pressure as the diamond table. The compact is therefore rendered self-sharpening by this constant greater wearing away of material rearwardly of the front cutting face.

However, the abrasion resistance of the wear-flat rubbing on the formation generates heat which is additional to the heat generated by cutting. Tungsten carbide has high abrasion resistance, and when the substrate or carrier is formed from tungsten carbide the additional heat generated by abrasion may be sufficient to cause the thermally activated deterioration of the diamond table at an increasingly rapid rate. It is generally accepted that a standard cutting element of the kind described, having a tungsten carbide substrate, generally operates efficiently only until it is about 30% worn. From thereon the cutting element may become thermally unstable and wear extremely rapidly leading quickly to failure of the cutter. When a sufficient number of cutting elements have failed in this manner the bit becomes useless for further drilling.

The combination of low toughness and high heat generation can also cause heat checking of the tungsten carbide carrier material with resultant premature failure of the bit. "Heat checking" is a term in the art which refers to craze cracking of the wear flat which develops on the carrier, due to abrasive heating with intermittent quenching by the drilling fluid.

The approach taken by the present invention is to overcome the above-mentioned problems by reducing the abrasion resistance of the less hard substrate of the cutting element and/or the carrier so as to reduce the additional heat generated by rubbing of the wear-flat on the formation being drilled It is, however, desirable that abrasion resistance of the substrate and/or carrier should be reduced without also reducing its erosion resistance. In use the cutter assemblies and their cutting elements are subjected to the substantial eroding effect of drilling fluid flowing over them continuously during drilling. Cemented tungsten carbide has considerable resistance to such erosion and this should preferably not be significantly reduced in attempting to reduce the abrasion resistance.

SUMMARY OF THE INVENTION

According to one aspect of the invention there is provided a cutting element for a rotary drill bit comprising a thin superhard table of polycrystalline diamond material, defining a front cutting face, bonded to a less hard substrate, wherein the substrate is formed from a material containing at least a proportion of tungsten metal. Such material may also be used in a carrier on which the cutting element is mounted to form a cutting assembly Use of a substrate containing tungsten metal may overcome the problems described above with relation to the existing cemented tungsten carbide material. The presence of the tungsten metal in the substrate and/or carrier has the effect of reducing the abrasion resistance, and thereby reducing the heat generated by rubbing of the wear flat on the formation being drilled.

In addition, the tungsten-containing material may be even stronger than cemented tungsten carbide in cantilever bending and shear forces to which cutter assemblies may be subject in use.

The material of the substrate preferably contains at least about 50% (by weight) tungsten metal, for example at least about 80%. In a preferred embodiment the substrate is formed of a metal matrix composite comprising tungsten metal particles in a metal binder phase.

The metal matrix composite may be formed by a sintering process, or by hot-pressing.

Any suitable metal or metal alloy may be used as the metal binder phase of the composite. For example, any of the following materials may be suitable: Cu, Co, Ni+Cu, Ni+Fe, Ni+Fe+Mo, Co+Ni.

In one embodiment according to the invention the metal matrix composite has the following composition (percentages by weight):

W: 95%
Ni: 3.5%
Fe: 1.5%

The invention includes within its scope arrangements where the substrate is formed of a metal matrix including tungsten metal in addition to the tungsten carbide normally used. It is found that the presence of a proportion of tungsten metal in the matrix alleviates some of the disadvantages of tungsten carbide alone, as mentioned above. In such embodiments of the invention the tungsten metal and tungsten carbide together may constitute at least about 50% by weight of the material from which the substrate or carrier is formed, and preferably at least about 80%.

The metal matrix composite may include tungsten metal particles and tungsten carbide particles in a metal binder phase and may be formed by sintering, by an infiltration process or by hot pressing a mixture of powdered tungsten carbide and tungsten metal with a catalyst, such as cobalt.

In the case where the substrate includes tungsten carbide, the tungsten metal may be replaced by another refractory material which is softer than the tungsten carbide. Such refractory materials include boron, hafnium, iridium, molybdenum, niobium, osmium, rhenium, rhodium, tantalum and zirconium.

Accordingly the invention further provides a cutting element for a rotary drill bit comprising a thin hard facing table of polycrystalline diamond material, defining a front cutting face, bonded to a less hard substrate, wherein the substrate comprises a compound of cemented tungsten carbide and a softer refractory material.

The invention also provides a method of forming a cutting element for a rotary drill bit comprising placing in a high pressure/high temperature press a layer of polycrystalline diamond particles, said layer having a front face and a rear face, and, in contact with said rear face, a further layer including at least a proportion of tungsten metal, and subjecting said layers to high pressure and temperature so as to form, on cooling, a solid composite compact comprising a superhard table of polycrystalline diamond material bonded to a less hard substrate containing at least a proportion of tungsten metal.

The invention further provides a method of forming a cutting element for a rotary drill bit comprising placing in a high pressure/high temperature press a layer of polycrystalline diamond particles, said layer having a front face and a rear face, and, in contact with said rear face, a further layer comprising a mixture including powdered tungsten carbide, a powdered softer refractory material and a catalyst, and subjecting said layers to high pressure and temperature so as to form, on cooling, a solid composite compact comprising a superhard table of polycrystalline diamond material bonded to a less hard substrate comprising a compound including cemented tungsten carbide and said softer refractory material.

The invention includes within its scope a cutter assembly for a rotary drill bit comprising a cutting element according to the invention mounted, for example by brazing, on a carrier which may be in the form of a stud or post to be received in a socket in the bit body. The carrier may comprise like material to that of the substrate.

The invention also includes within its scope a rotary drill bit of the kind first referred to including cutting elements or cutter assemblies according to the invention.

DETAILED DESCRIPTION OF THE PREFERRED EMBODIMENTS

Figure 1:
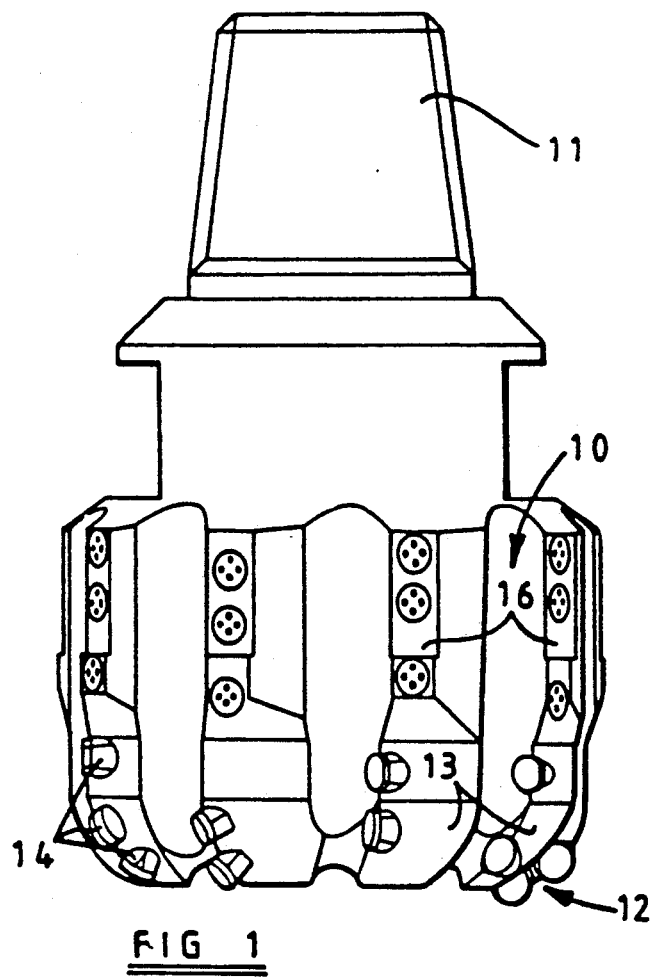
FIG. 1 is a side elevation of a typical drill bit in which cutter assemblies according to the invention may be used.
Figure 2:
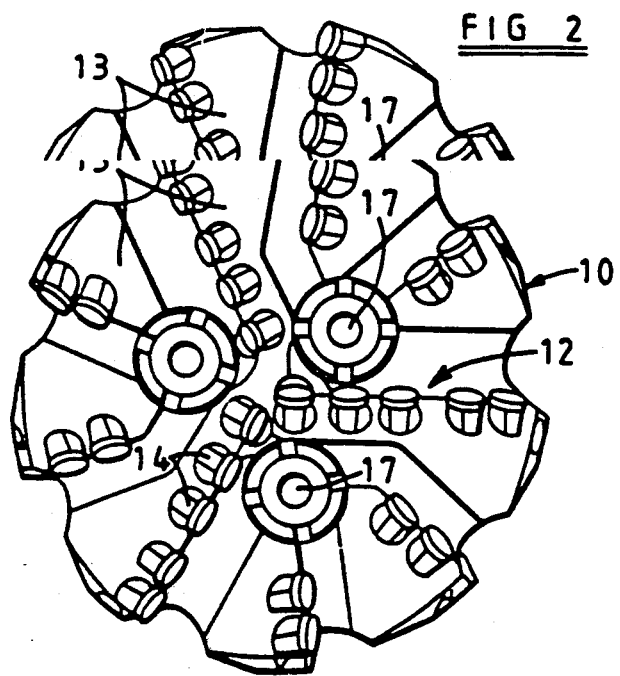
FIG. 2 is an end elevation of the drill bit shown in FIG. 1.

FIGS. 1 and 2 show a typical full bore drill bit of a kind to which cutter assemblies of the present invention are applicable. The bit body 10 is machined from steel and has a threaded shank 11 at one end for connection to the drill string. The operative end face 12 of the bit body is formed with a number of blades 13 radiating from the central area of the bit, and the blades carry cutter assemblies 14 spaced apart along the length thereof. The bit has a gauge section including kickers 16 which contact the walls of the borehole to stabilize the bit in the borehole. A central passage (not shown) in the bit body and shank delivers drilling fluid through nozzles 17 in the end face 12 in known manner.

Figure 3:
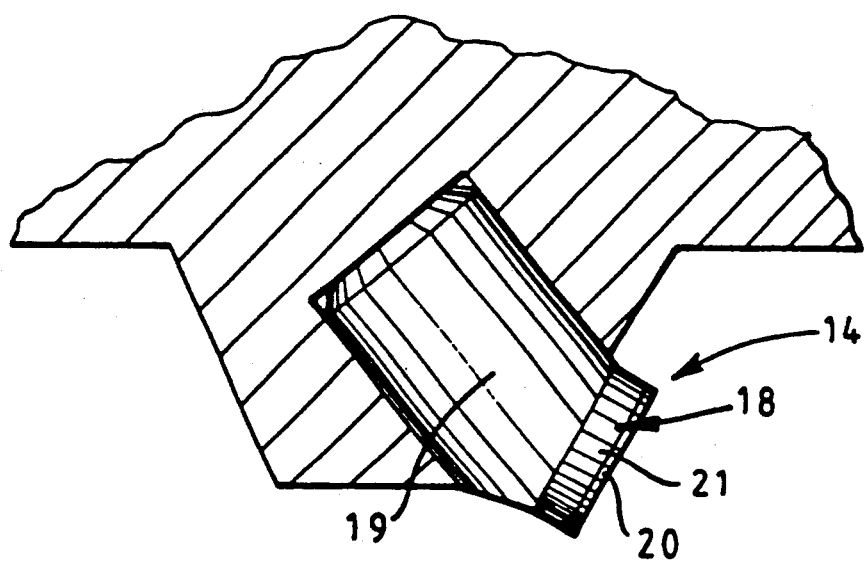
FIG. 3 is a side elevation of a typical cutter assembly of the kind to which the invention relates.

As shown in greater detail in FIG. 3, each cutter assembly 14 comprises a preform cutting element 18 mounted on a carrier 19 in the form of a stud which is located in a socket in the bit body. Each preform cutting element is in the form of a circular tablet comprising a thin facing layer 20 of polycrystalline diamond bonded to a backing layer 21, both layers being of uniform thickness. The rear surface of the backing layer is bonded, for example by LS bonding, to a suitably oriented surface on the stud.

It will be appreciated that the drawings illustrate only one example of the many possible variations of the type of bit and cutter assembly to which the invention is applicable and many other arrangements are possible. For example, the bit body, instead of being machined from steel, may be molded from tungsten carbide matrix infiltrated with a binder alloy. Also, instead of the cutting element being a two-layer preform, it may comprise a unitary tablet of thermally stable polycrystalline diamond material. Instead of the configuration shown, the carrier may be in the form of a generally cylindrical stud, the circular cutting element being mounted on an end surface of the stud and being generally coaxial therewith.

In a first preferred embodiment, the carrier is a metal matrix composite having the following composition (percentages by weight):

W: 95%
Ni: 3.5%

Fe: 1.5%

In this preferred example, the percentage of tungsten metal is greater than 80%, but lower percentages of tungsten metal may also provide advantage. Preferably, however, the material contains at least about 50% tungsten metal.

Lower percentages of tungsten metal may be appropriate in the case where the material of the carrier also includes tungsten carbide, such as a metal matrix composite including tungsten metal particles and tungsten carbide particles in a metal binder phase.

Where the material includes tungsten carbide, the tungsten metal and tungsten carbide together preferably constitute at least about 50%, and more preferably 80%, of the material from which the carrier is formed. As in the embodiments previously described, the carrier may be formed by sintering, infiltration or hot-pressing. Such methods are well known in the art and will not therefore be described in detail.

The composite carrier material preferably contains at least 50% tungsten metal and, in some embodiments, at least about 80% tungsten metal.

The use of a composite including tungsten metal according to the invention for the carrier may facilitate the bonding of the cutting element to the carrier.

In another embodiment of the invention, the material of the carrier is thoriated tungsten, which comprises thorium dioxide (e.g. about 2%) with the balance tungsten metal.

As previously mentioned, the material according to the invention is found to be stronger than cemented tungsten carbide when subjected to cantilever bending/shear forces. Laboratory evaluation shows that, when shear loading a standard 16 mm diameter post held in a high strength steel fixture, the tungsten metal composite begins to deform plastically at the same force level as a similar cemented tungsten carbide post fractures. Failure of the tungsten metal composite occurs at 30% higher forces than those at which tungsten carbide fails, and it does so in a ductile manner after significant plastic deformation. These characteristics are advantageous in the environment in which such cutter assemblies operate.

Figure 4:
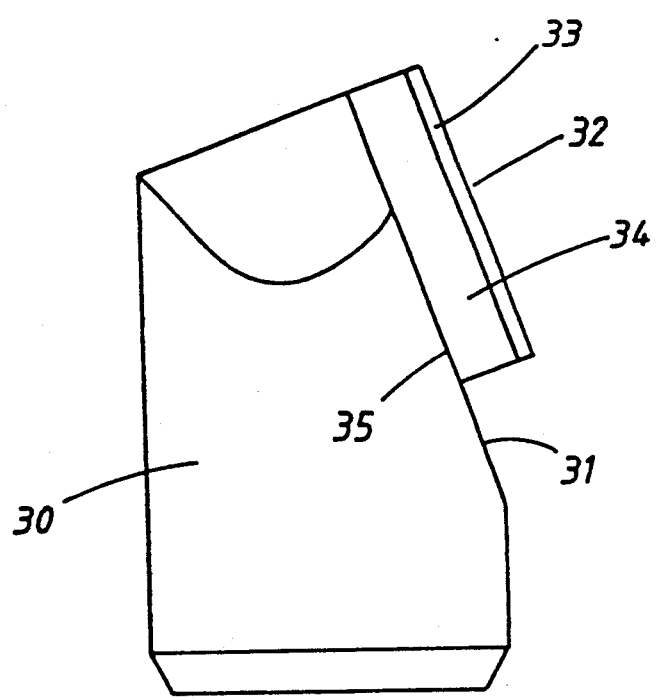
FIG. 4 is a side elevation of another typical cutter assembly to which the present invention may be applied.

FIG. 4 shows another cutter assembly comprising a generally cylindrical stud 30, which is formed adjacent one end thereof with an inclined plane surface 31 which is disposed at an angle to the longitudinal axis of the stud 30. The stud 30 may be formed from cemented tungsten carbide, but is preferably formed from a material containing at least a proportion of tungsten metal in accordance with the first embodiment above.

Mounted on the inclined surface 31 of the stud is a preform cutting element 32 comprising a superhard facing table 33 of polycrystalline diamond bonded to a thicker and less hard substrate 34. The cutting element 32 is in the form of a circular disc.

The rear surface 35 of the cutting element is flat and is brazed to the inclined plane surface 31 of the stud 30. The cutting element may be brazed to the stud by the process known as "LS bonding" in which a heat sink is applied to the polycrystalline diamond table of the cutting element to prevent thermal degradation of the table during the bonding process.

A plurality of such cutter assemblies are mounted in the body of a rotary drill bit of the kind first referred to. The bit body is formed over the surface thereof with a plurality of cylindrical sockets of circular cross-section and received in each socket is the stud 10 of a cutter assembly. The cutter assembly is usually shrink-fitted or brazed into its socket. The general construction of such drill bits is well known and will not therefore be described in further detail.

Hitherto, prior art two-layer cutting elements of the kind shown in the drawing have comprised a substrate 34 of cemented tungsten carbide. The front diamond table 33 and the substrate 34 are formed simultaneously by placing layers of polycrystalline diamond particles and tungsten carbide in a high pressure/high temperature press, a catalyst, such as cobalt, normally also being present in the layer of tungsten carbide.

According to the present invention, the material to form the substrate includes at least a proportion of tungsten metal, or comprises tungsten carbide and tungsten metal or some other softer refractory material.

In one embodiment of the invention the substrate 34 is a metal matrix composite having the following composition (percentages by weight):

W: 95%
Ni: 3.5%
Fe: 1.5%

In this example the percentage of tungsten metal is greater than 80%, but lower percentages of tungsten metal may also provide advantage. Preferably, however, the material contains at least about 50% tungsten metal.

Lower percentages of tungsten metal may be appropriate in the case where the material of the substrate also includes tungsten carbide, such as a metal matrix composite including tungsten metal particles and tungsten carbide particles in a metal binder phase.

In the case where the substrate includes tungsten carbide, the tungsten metal may be replaced by another refractory material which is softer than the tungsten carbide. Such refractory materials include boron, hafnium, iridium, molybdenum, niobium, osmium, rhenium, rhodium, tantalum and zirconium.

Where the material includes tungsten carbide, the tungsten metal (or other softer refractory material) and tungsten carbide together preferably constitute at least about 50% by weight, and more preferably 80%, of the material from which the carrier is formed. The substrate may be formed by sintering or hot-pressing. Such methods are well known in the art and will not therefore be described in detail.

As previously explained, the presence of the tungsten metal or other softer refractory material in the substrate 34 serves to reduce the abrasion resistance of the substrate. The reduction in abrasion resistance results in less generation of heat when the cutting element bears against the formation being drilled, and thus delays the onset of thermal degradation of the diamond table.

As previously mentioned, although the stud 30 may be formed from cemented tungsten carbide, it might also be formed from similar material to the substrate 34, and may comprise, for example, tungsten carbide including a softer refractory material such as tungsten metal, as described in the first embodiment. This may be advantageous, since after a certain degree of wear has occurred the wear-flat will also extend across part of the end of the stud 30, and reduction of the abrasion resistance of the stud will in that case assist in reducing the heat generated during drilling.

I claim:

1. A cutting element for a rotary drill bit comprising a thin superhard table of polycrystalline diamond material, defining a front cutting ace, bonded to a less hard substrate, wherein the substrate is formed from a material comprising at least about 50% (by weight) tungsten metal.

2. A cutting element according to claim 1, wherein the material of the substrate contains at least about 80% (by weight) tungsten metal.

3. A cutting element according to claim 1, wherein the substrate is formed of a metal matrix composite comprising tungsten metal particles in a metal binder phase.

4. A cutting element according to claim 3, wherein the metal matrix composite is sintered.

5. A cutting element according to claim 3, wherein the metal matrix composite is hot-pressed.

6. A cutting element according to claim 3, wherein the metal binder phase of the composite comprises a material selected from:

Cu, Co, Ni+Cu, Ni+Fe, Ni+Fe+Mo, Co+Ni.

7. A cutting element according to claim 6, wherein the metal matrix composite has the following composition (percentages by weight):

W: 95%
Ni: 3.5%
FE: 1.5%

8. A cutting element according to claim 1, wherein the substrate further includes tungsten carbide.

9. A cutting element according to claim 8, wherein the tungsten metal and tungsten carbide together constitute at least about 50% by weight of a material from which the substrate is formed.

10. A cutting element according to claim 8, wherein the tungsten metal and tungsten carbide together constitute at least about 80% by weight of the material from which the substrate is formed.

11. A cutting element according to claim 8, wherein the substrate comprises a metal matrix composite including tungsten metal particles and tungsten carbide particles in a metal binder phase.

12. A cutting element according to claim 11, wherein the metal matrix composite is selected from the group consisting of: (a) sintered, catalyzed materials, (b) infiltrated, catalyzed materials, and (c) hot pressed, catalyzed materials.

13. A cutting element for a rotary drill bit comprising a thin hard facing table of polycrystalline diamond material, defining a front cutting face, bonded to a less hard substrate, wherein the substrate comprises a compound of cemented tungsten carbide particles and particles of a refractory material which is softer than tungsten carbide, the particles of refractory material being sufficient to substantially reduce the abrasion resistance of the cemented tungsten carbide alone.

14. A cutter assembly for a rotary drill bit comprising a cutting element mounted on a carrier in the form of a stud to be received in a socket in the bit body, the cutting element comprising a thin superhard table of polycrystalline diamond material, defining a front cutting face, bonded to a less hard substrate, the substrate being formed from a material comprising at least about 50% (by weight) tungsten metal and being bonded to a surface on the stud.

15. A cutter assembly for a rotary drill bit comprising a cutting element mounted on a carrier in the form of a stud to be received in a socket in the bit body, the cutting element comprising a thin superhard table of polycrystalline diamond material, defining a front cutting face, bonded to a less hard substrate, the substrate being bonded to a surface on the stud and comprising a compound of cemented tungsten carbide particles and particles of a refractory material which is softer than tungsten carbide, the particles of refractory material being sufficient to substantially reduce the abrasion resistance of the cemented tungsten carbide alone.

* * * * *